Patented Dec. 27, 1932

1,891,918

UNITED STATES PATENT OFFICE

EDWARD R. DILLEHAY, OF GLEN ELLYN, ILLINOIS, ASSIGNOR TO THE RICHARDSON COMPANY, OF LOCKLAND, OHIO, A CORPORATION OF OHIO

MOLDING COMPOSITION AND PROCESS

No Drawing.      Application filed April 12, 1929. Serial No. 354,711.

My invention is of importance in the manufacture of articles from molding compositions comprising inexpensive binders and fibers, and of these a common example is a composition of asphalt, fibers (of vegetable or mineral origin) and non-fibrous filler materials. Such compositions vary widely in characteristics with the nature and proportions of ingredients, the mixing processes, etc. The nature of the composition per se is not of importance in the present invention, the process which I shall describe being effective so far as my investigations have gone with all types of bituminous molding compositions and with other types of molding compositions not ordinarily considered bituminuous, the only requirements being that the composition will not be repulsive to a condensation resin, as hereinafter defined, and capable of withstanding some heat during a molding operation.

As applied to bituminous molding compositions, particularly of the asphaltic type, my invention solves a number of important problems which will be apparent from a statement of my objects.

It is an object of my invention to improve the surface characteristics of molding compositions.

It is another object of my invention to provide a molded article which has a body of one composition and a surfacing of a different composition having differing characteristics; and it will be seen of particular importance where the body composition is inexpensive and the surfacing composition is expensive, or where the body composition is relied upon for one characteristic which the surfacing composition does not have, while the surfacing composition is relied upon for appearance or some other characteristic which the body composition does not have. In this connection, my invention permits the making of tiles and the like articles for interior wall facing, for roofing, and the like, which tiles will have the resilience and toughness of a fibrous composition together with a satisfactory surface hardness, durability and permanence of surface coloring.

It is still another object of my invention to improve the surfacing of articles made from bituminous plastics.

It is still another object of my invention to provide an article molded from a bituminous plastic with a surface suitable for the reception of coating compositions. A word of explanation is necessary here. There are constituents of bituminous binders soluble in practically all paint, varnish and lacquer vehicles. Furthermore, there is some evidence to believe that constituents of bituminous binders are soluble in the bodies of some if not all paints, lacquers and varnishes irrespective of the action of solvents. There has hitherto been no very satisfactory solution of the problem of applying, for example, a white surfacing in imitation of porcelain to a molded article of bituminous plastic such as a tank or seat for a toilet fixture, and securing thereby an article which in a short time would not turn yellowish and unsightly. A solution of the problem has been attempted along the lines of coating the bituminous body with something which would serve as a seal between the coating and the bituminous binder; but such seals have suffered from lack of adhesion, lack of impermeability, lack of strength and continuity, and lack of economy. It has been proposed to coat asphaltic articles as an example, with a bakelite varnish; but since such varnishes ordinarily require the application of heat, the proposal has not met with success.

It is a specific object of my invention to secure an article molded of a bituminous plastic which has a surfacing of a phenolic condensation product, heat treated in place without the destruction of the accuracy of dimension of the body of the article. Ancillary to this object is the provision of an article with a phenolic condensation surface and a body of cheaper material.

These and other objects of my invention which will be set forth hereinafter or will be apparent to one skilled in the art upon reading these specifications, I accomplish by that certain process and in that product, of which I shall now describe a preferred embodiment.

As an example of a bituminous composition suitable for molding, I may take 50% by weight of asphaltic material, having a ball and ring softening point say of between 150 and 350° F. and to this, while it is in a state of extensible and adhesive gumminess, in a W. P. mixer of ordinary type which has a steam heated jacket, I may add say 15% of cotton fiber. Upon the rotation of the mixer blades, the asphalt will first coat and adhere to the masses of aggregated fibers and as the mixing progresses, the repeated extending action which is incident to the mechanical work and the binder condition, will serve to cause the binder to tedder out the fibers, breaking down the aggregates into individualized fibers and distributing these fibers homogeneously throughout the body of the binder and interfelting them therein, thus forming a mass suitable for molding. Filler materials may be added and in the example given, I may, let us say, add 35% of mineral filler comprising diatomaceous earth. The result will be a plastic mass suitable for molding. The ingredients, proportions and mixing method which I have just outlined, are exemplary only and are not a limitation upon my process. I have described them as producing a plastic suitable for molding into a considerable range of useful articles. Other compositions more particularly adapted for certain uses will be equally as effective in the practice of my invention.

Compositions of this character are molded while they are sufficiently heated to have the required plasticity. It is common practice to weigh out a mold charge and transfer it to the cavity of a female mold. Molding itself may be done in molds at ordinary temperatures or in molds which have fittings for the circulation of heating or cooling fluids. The molding is done under pressure and the article is removed from the molding as soon as set sufficiently to give the desired hardness and surface characteristics.

In the practice of my invention I take a mold charge which has been previously weighed and exists in the form of a lump preferably of considerable compactness. This I dip or roll in or otherwise coat with a powdered phenolic composition product. Phenol-formaldehyde molding powder is an article readily obtained upon the market and this material is satisfactory for use in the practice of my invention. When a warm mold charge is rolled in or otherwise coated with this powder, the power adheres readily to it and completely covers the surface. The coated mold charge is then transferred to a mold as described, and pressure is applied thereto. In practicing my invention, the mold is preferably drilled or otherwise prepared for the circulation of steam and is kept during the molding operation at say around 300° F. Pressure upon the plungers in the mold will cause the charge to flow and fill the mold cavity; and I have found it characteristic of a coated charge that when molded under sufficient heat, the coating becomes plastic or liquifies and tends to form an even, continuous and impervious coating over the article and adjacent the mold walls. The pressure and the steam are left on from one to ten minutes, which is ample time for the thin coating of phenolic condensation product first to flow under the heat and then to be hardened thereby. It will be evident that heat is applied to it from without by the mold walls and from within by the residual heat of the mold charge, and it is common practice to mold asphaltic compositions, particularly the harder ones, with the charge originally at a temperature of 300° F. or higher depending somewhat on the nature of the material. Where the mold itself is heated, the temperature of 300° or higher in the mold charge itself is not necessary. Since the surfacing to be treated by the high temperature is comparatively thin, on the other hand, in the long run continuous molding operations, the mold itself will acquire and maintain a considerable degree of heat from the charges, so that steam heating the molds may not in all cases be necessary. It is however, essential that the phenolic condensation coating on the charge be first softened and then hardened in accordance with its characteristics by sufficient heat applied thereto, and in the majority of instances, it is necessary to heat the mold.

I prefer in ordinary practice after the first two minutes or so of molding in the hot mold, to cool the article before removal, and it is convenient to do this by shutting off the steam and causing cold water to circulate in the pockets of the mold wall. The mold will therefore be understood as preferably equipped with steam and cold water connections. As indicated, the cooling process may not in all cases be necessary, but I have found it advantageous both in that it tends further to set the body of the mold charge and to set and harden the coating. Molded articles come from the mold with a uniform thin coat of hardened phenolic condensation product on their surfaces and they possess a high and durable gloss. Particularly where a hard plastic is used in a well finished mold, the coating will enormously improve the surface finish and will mask residual imperfections in the actual surface of the body of the plastic. My process is primarily applicable to articles in the molding of which a very deep draw is not necessary since a very deep draw may tend somewhat to interfere with the uniformity of the coating which I obtain. However, my process is not limited to that specifically described, but is capable of a number of variations to adapt it to specialized conditions. Thus where a deep drawn article is to be produced, the mold charge instead of being in the form of a lump may be given a preliminary shaping approximating it to the configuration of the ultimate article and this preliminary shape while still plastic enough for further molding, may be coated with the phenolic condensation product in powder form; or instead of using the condensation product in powdered form, it may be dissolved in a quickly evaporating solvent and sprayed upon the charge. Another way to practice my invention is by spraying it upon the mold parts themselves.

Still another way, in molding a flat article such as a tile which it is desired to coat substantially only on one side, or on top and bottom, is to place a layer of the powdered phenolic condensation product in the mold, introduce the mold charge (preferably in a flat form) and then, if desired, introduce a second layer of the molding powder above the charge.

Condensation resins for molding exist and are commonly used in a preliminary solid, but heat-plastic form. Upon the application of heat this preliminary solid form becomes plastic and moldable, and a further chemical condensation brings about a final form which is again solid, but no longer heat-plastic, depending somewhat upon the extent to which the condensation and hardening action has been allowed to proceed. It is thus possible to preform the material in the preliminary stage, as by briquetting the powder into a desired shape. Sheets of condensation resin in the preliminary stage suitable for molding are also commonly supplied. These facts make possible other procedures as variants of the process I have herein described. The molding powder may be briquetted into a shape to cover a portion of a mold or to line the interior thereof, and after the shape has been set into position in the mold, a bituminous or other composition may be molded in place therein. These briquetted shapes may be quickly made upon automatic machines, say $\frac{1}{16}$ inch or thereabouts in thickness.

Again sheets may be cut to fill a portion of a mold. Or thin sheets may be softened somewhat by application of heat, as upon a steam table, and wrapped about a mold charge, or positioned in a mold adjacent the walls thereof leaving a cavity for the insertion of the additional mold charge.

Finally, I have found condensation resins in powdered form have, when their softening temperature is below the temperature of a heated mold, the power to soften and stick to the mold walls when merely dusted therein, and this furnishes an additional way in which condensation resins and other plastics may be associated in a mold. After the article is cured and hardened under heat and pressure, the resin no longer has a tendency to adhere to the mold walls, but will strip therefrom quite readily.

In all of these cases, it should be noted that the molding, and the subsequent hardening and curing of both the condensation resin and the body composition may be caused to occur simultaneously so that an integrally molded article is obtained.

As an exemplary article I have made gear shift knobs weighing about 50 grams with a bakelite surfacing which itself weighs but three to five grams so that I secure a knob with a bakelite finish and bakelite durability at one-tenth the cost of a solid bakelite article.

It is not necessary, however, simultaneously to mold the condensation resin and the fibrous mold charge. A pre-molded and hardened article may be made of a heat plastic substance, and this article may be placed in a mold with a quantity of condensation resin molding substance, with perfect satisfaction. In most cases, no doubt, the heat applied to the mold for the purpose of plasticizing and then curing the condensation resin is sufficiently transmitted to the preformed heat plastic article to soften at least the surface thereof and produce an adequate bond. In some cases the heat may be sufficient to soften the body of the pre-molded article and permit its further shaping in the second molding operation. Thus, in the manufacture of seats for toilet fixtures, I form, from a ring of plastic dough, a seat blank in a female mold of the same general shape, but of slightly smaller size than that ordinarily used in the manufacture of seats. I then take the regular mold, and after introducing therein a quantity of bakelite molding powder, I insert the seat blank and subject the combined charge to a pressure molding operation under heat. This proceedure is of particular advantage where it is desired to produce articles of comparatively a deep draw, with an exterior coating of condensation resin. Here the premolded blank will initially act as a supplementary plunger to cause the flowing of the softened resin thereabout, before the blank itself has become softened very much.

The condensation product coating is highly uniform and can be made in any color desired. My process therefore furnishes a way in which, from bituminous plastics which are normally black or very dark, colored articles can be made. It furnishes also an impervious coating over a bituminous article which is well adapted to receive, without yellowing, light colored or white coatings of paint or enamel; and the improved gloss and polish of my articles enhances the value of such a coating. Generally, however, the finish obtainable upon the surfacing of the condensation resin itself is much superior in appearance to any coating which might be put over it.

Finally I am able to make beautiful, serviceable and sanitary tile from my product at a comparatively small fraction of the cost of ceramic tile. There has long been a demand for a tile for roofing, flooring or wall-surfacing which will have a toughness and resiliency comparable to that of a fibrous bituminous product, without a sacrifice of permanency or attractiveness of surface. Hitherto such a demand could not be filled because, while bituminous and analogous compositions can be made very tough and resilient, waterproof and sanitary, they have an unattractive surface, which is both too soft for service, and unsuitable for receiving ordinary coatings. Thus it has hitherto been impossible to make a permanent white tile by coating a bituminous product. Nor can much be gained by making a thinner tile of ceramic or other substance and bodily joining it to a bituminous composition. This is expensive, and in addition unsatisfactory because the preformed tile must of necessity be of considerable thickness whereas to gain the benefit of the resiliency of the body of fibrous composition the surfacing must be comparatively quite thin and very firmly bonded thereto. By my process, I am able to make a tile of a body of bituminous or other fibrous plastic and a thin surface layer of hardened phenolic condensation product which in itself may have the required appearance, or may be satisfactorily coated to obtain it.

By the term "bituminous" or "bitumen" in the ensuing claims I intend to include asphalts, tars, waxes, blown oils, coal tar pitch, mineral and fatty acid pitches, rosin, and the like.

By "condensation resin" I intend to include both natural resinous materials which have the required physical properties and the synthetic resins. A synthetic resin is a complex amorphous organic semi-solid or solid material, usually a mixture of substances; built up by chemical reaction and approximating the natural resins in various physical properties; namely, lustre, fracture, comparative brittleness at ordinary temperatures, insolubility in water, and fusibility or plasticity when heated or exposed to heat and pressure but commonly deviating widely from natural resins in chemical constitution and behavior with reagents.

*Group A.*—Resins made essentially by reacting on nonresinous substances with a resinifying agent. This group includes the phenol-formaldehyde (phenol derivative) products e. g. bakelite, redmanol, condensite, etc., cumaron resin, glycerine and phthalic acid condensation bodies, ketone resins, the products of polymerization of vinyl compounds, urea thiourea derivatives and the sulphur phenol resins.

*Group B.*—Resins made by reacting on natural resins with various chemical agents to substantially modify composition and properties, such as the various resinates of zinc, lime, alumina and so-called ester gums and sulphur-rubber compounds.

*Group C.*—Substances which are not essentially resins but do possess plastic properties such as the various esters and compounds of cellulose, e. g. nitro cellulose, cellulose acetate, pyroxilin, etc.

Having thus described my invention, what I claim as new and desire to secure by Letters Patent, is:—

1. That process of molding articles of bituminous composition which comprises forming a mold charge of said composition while plastic, rolling said mold charge in a condensation resin molding powder, whereby it becomes coated therewith and molding said coated charge by plastic flow under heat and pressure.

2. That process of molding an article from a bituminous composition and a condensation resin which comprises associating said materials and molding them by plastic flow with said bituminous composition forming an interior body and said condensation resin forming an exterior coating lying next the mold wall.

3. That process of molding an article of bituminous composition and a condensation resin which comprises forming a mold charge of said bituminous composition, exteriorly coating said charge with a condensation resin, molding said charge by plastic flow under pressure and under heat sufficient to set said condensation resin, and before removing the article from the mold, cooling said charge.

4. That process of molding an article of bituminous composition and a condensation resin which comprises associating said substances as contiguous bodies in a heated mold with said condensation resin lying next a mold wall, and molding said substances simultaneously under pressure.

5. That process of molding an article of heat plastic fibrous composition and a condensation resin which comprises associating a condensation resin with a heated mold charge of said heat-plastic fibrous composition in a mold, and simultaneously molding said substances as contiguous bodies under heat and pressure.

6. That process of molding an article of heat plastic fibrous composition and a condensation resin which comprises associating a condensation resin with a heated mold charge of said heat-plastic fibrous composition in a mold, and simultaneously molding said substances under heat and pressure, said condensation resin being so positioned in the mold as to form a surface coating for the article produced thereby.

7. A molded article comprising a body of bituminous plastic and an external surface of hardened condensation resin.

8. A molded article comprising a body of bituminous plastic and an external surfacing of hardened condensation resin, said surfacing being in weight not over one tenth the total weight of said article.

9. A molded article comprising a body of bituminous plastic and an external surface of hardened condensation resin simultaneously molded under heat and pressure.

10. A molded article comprising a body of composition comprising asphalt and fiber, and a surfacing of phenolic condensation resin.

11. That process of producing a composite molded article which comprises molding a blank of asphalt-fiber composition, introducing said blank and a quantity of condensation resin molding powder into a mold, and molding a composite article therefrom under heat sufficient first to soften said resin and afterward to harden and set it.

12. That process of producing a composite molded article which comprises molding a heat plastic bituminous substance in the presence of a substance initially heat plastic, but having the property of hardening the curing under heat to a nonheat plastic condition, said substances existing as contiguous bodies.

EDWARD R. DILLEHAY.